US012121891B2

(12) United States Patent
Solow et al.

(10) Patent No.: US 12,121,891 B2
(45) Date of Patent: Oct. 22, 2024

(54) DUAL DELIVERY NEEDLE WASH SYSTEM

(71) Applicant: Waters Technologies Corporation, Milford, MA (US)

(72) Inventors: Rose Solow, Newark, NJ (US); David A. Simpson, Hopkinton, MA (US); Colin F. Fredette, Ashland, MA (US); Marc E. Lemelin, Douglas, MA (US); Joshua A. Burnett, Taunton, MA (US)

(73) Assignee: Waters Technologies Corporation, Milford, MA (US)

( * ) Notice: Subject to any disclaimer, the term of this patent is extended or adjusted under 35 U.S.C. 154(b) by 299 days.

(21) Appl. No.: 17/403,109

(22) Filed: Aug. 16, 2021

(65) Prior Publication Data
US 2022/0048035 A1 Feb. 17, 2022

Related U.S. Application Data

(60) Provisional application No. 63/066,393, filed on Aug. 17, 2020.

(51) Int. Cl.
| | |
|---|---|
| *G01N 1/14* | (2006.01) |
| *B01L 3/02* | (2006.01) |
| *G01N 1/34* | (2006.01) |
| *G01N 35/10* | (2006.01) |

(52) U.S. Cl.
CPC .............. *B01L 13/02* (2019.08); *G01N 1/14* (2013.01); *G01N 1/34* (2013.01); *B01L 3/02* (2013.01); *B01L 2400/049* (2013.01); *G01N 2001/1418* (2013.01); *G01N 35/1004* (2013.01); *G01N 2035/1006* (2013.01); *G01N 35/1079* (2013.01)

(58) Field of Classification Search
CPC .... B01L 13/02; B01L 3/02; B01L 2200/0689; B01L 2200/146; B01L 2400/049; G01N 1/14; G01N 1/34; G01N 2001/1418; G01N 35/1004; G01N 35/1079; G01N 2035/1006

See application file for complete search history.

(56) References Cited

U.S. PATENT DOCUMENTS

| | | | |
|---|---|---|---|
| 4,730,631 A | 3/1988 | Schwartz | |
| 4,817,443 A | 4/1989 | Champseix et al. | |
| 5,132,088 A | 7/1992 | Wakatake | |
| 8,758,702 B2 | 6/2014 | Blouin et al. | |
| 2006/0263250 A1* | 11/2006 | Blouin | ............... G01N 35/1079 422/63 |
| 2009/0032065 A1 | 2/2009 | Bantz et al. | |
| 2013/0008237 A1* | 1/2013 | Usowicz | ................ G01N 30/16 73/61.52 |
| 2013/0019699 A1* | 1/2013 | Usowicz | ............ G01N 35/1009 73/864.85 |
| 2013/0049302 A1* | 2/2013 | Lemelin | ............. G01N 30/6026 277/590 |
| 2019/0302066 A1 | 10/2019 | Burnett et al. | |
| 2020/0200717 A1* | 6/2020 | Minato | .............. G01N 35/1097 |
| 2022/0099694 A1* | 3/2022 | Bergbaur | ................ B01L 3/021 |

OTHER PUBLICATIONS

International Search Report and Written Opinion issued in PCT Application No. PCT/IB2021/057533 dated Oct. 25, 2021.

* cited by examiner

*Primary Examiner* — Jill A Warden
*Assistant Examiner* — John McGuirk
(74) *Attorney, Agent, or Firm* — WOMBLE BOND DICKINSON (US) LLP; Deborah M. Vernon; John V. Forcier

(57) ABSTRACT

Described herein are systems and methods used for washing needle assemblies with multiple needles.

7 Claims, 5 Drawing Sheets

DUAL DELIVERY NEEDLE WASH SYSTEM

FIELD OF DISCLOSURE

This disclosure relates generally to needle wash systems, and in particular, to systems and methods for washing needle assemblies with multiple needles.

BACKGROUND

Generally, sample management equipment for use, for example, in liquid chromatography systems, use flow-through needle systems for obtaining a sample from, for example, microtiter plates or vials. These flow-through-needle systems include a hollow needle for aspirating the sample volume, and that is also used as a piercing needle to break through sample covers, such as well-plate seals and cap mats, which create certain issues.

Where the sample needle acts as the piercing needle to enter a vial or well, small particulates from the vial septa/wellplate mat can be torn off during piercing. These particulates then can cause clogging in the needle, needle seal, or in the flow path of the injection, thereby contaminating the sample and/or preventing proper injection. Textured sample needles have partially mitigated some of the issues, but are not a full solution to the piercing/clogging issue.

SUMMARY

Generally, the disclosure is directed to introducing a puncture needle to a needle carriage design for acquiring samples to improve puncture performance. Incorporating a puncture needle in to the system reduces or eliminates tearing small particulates from the vial septa/wellplate mat, thereby reducing clogging in the system. The dual needle assembly includes a hollow puncture needle and a sample needle that rides coaxially within the inside diameter (ID) of the puncture needle. The dual needle assembly is configured for relative movement between the puncture needle and the sample needle. However, the introduction of a puncture needle for improved puncture performance necessitates a change to a typical flow through needle (FTN) wash system of a sample manager (see FIG. 1).

In FTN auto-samplers without a puncture needle, it is only necessary to wash the outside of the sample needle between injections to maintain cleanliness and reduce carryover and cross-contamination. As shown in FIG. 1, a conventional wash system 10 includes a wash tower 14 that receives the sample needle 12 and then injects a wash solution into the bottom of the wash tower (syringe port 16). The wash solution overflows the wash tower to wash the needle 12. The system 10 does not actively remove the wash fluid or vapors from the wash tower 14 or associated equipment. With a puncture needle, it is now necessary to not only wash the outside of the sample needle, but also the ID of the puncture needle and the outside diameter (OD) of the puncture needle. Effective washing of both sample needle and puncture needle is necessary to achieve low levels of carryover and cross-contamination for users.

In one aspect, the disclosure is related to a system for washing a needle assembly having a first needle and a second needle. The system includes a wash tower having an elongate body defining an opening in a top surface thereof and a passageway extending downwardly therefrom, a first port disposed proximate the top surface of the wash tower and in fluid communication with the passageway, a second port disposed proximate a bottom surface of the wash tower and in fluid communication with the passageway, a pumping system configured to deliver a wash solution to at least one of the first port or the second port, and an aspiration system configured to engage at least a portion of the needle assembly so as to evacuate any wash solution or solution vapors resident in the needle assembly or the wash tower.

In various embodiments of the foregoing aspect, the pumping system is configured to deliver the wash solution to the first port and the second port simultaneously. The opening of the wash tower may be configured to at least partially receive the needle assembly. The first needle may be a puncture needle having an outer diameter and an inner diameter and the second needle may be a sample needle disposable within the inner diameter of the puncture needle. The aspiration system may be in fluid communication with the inner diameter of the puncture needle and may include a pump for generating a vacuum on the needle assembly and/or wash tower.

In some embodiments, the passageway of the wash tower may extend along a substantial length of the wash tower. A seal assembly may be disposed at a distal end of the passageway and configured to engage a distal end of the sample needle. The system may further include a force sensor configured to provide feedback on the engagement of the sample needle with the seal assembly. In various embodiments, the system may also include a stop mechanism configured to control movement of the needle assembly relative to the wash tower to, for example, prevent contact between the needle assembly and the wash tower and/or control the level of engagement between the sample needle and the seal assembly.

Additionally, the system may include a controller in electrical communication with the pumping system, the aspiration system, and a needle assembly drive system (see 330 in FIGS. 4A and 4B). The controller may be configured to control at least one of a movement of the needle assembly relative to the wash tower, relative movement between the first needle and the second needle, actuation of the pumping system, actuation of the aspiration system, or a wash protocol. In some embodiments, the wash protocol parameters are given as either a set run time or a set delivery volume depending on the system. For example, users can set the wash protocol as either the time the pumping system runs or a volume of wash delivered by the pumping system.

In another aspect, the disclosure relates to a method of performing a wash cycle or process on a needle assembly having a first needle and a second needle. The method includes the steps of introducing the needle assembly to a wash tower, where the wash tower has an elongate body defining an opening in a top surface thereof and a passageway extending downwardly therefrom and at least a portion of the needle assembly is inserted into the passageway; applying a vacuum to an internal space defined by the needle assembly; and introducing a wash solution via a pumping system to the wash tower, where the wash solution is directed to a first port disposed proximate the top surface of the wash tower and/or a second port disposed proximate a bottom surface of the wash tower.

In various embodiments of the foregoing aspects, the first needle is a puncture needle having an outer diameter and an inner diameter and the second needle is a sample needle disposable within the inner diameter of the puncture needle. In some embodiments, the step of directing the wash solution to the first port and the second port is carried out simultaneously. The step of applying a vacuum to an internal space may include activating an aspiration system that is in fluid communication with the inner diameter of the puncture needle so as to evacuate any wash solution or solution vapors resident in the needle assembly and/or the wash tower. The step of introducing the needle assembly to the wash tower may include inserting the puncture needle into the passageway, inserting the sample needle into the puncture needle inner diameter after the wash solution has been introduced to the wash tower, and moving the sample needle through the puncture needle and into the passageway. A distal end of the sample needle engages with a seal assembly disposed at a distal end of the passageway. The wash tower may be associated with a force sensor configured to provide feedback on the engagement of the sample needle with the seal assembly. The step of introducing the needle assembly to the wash tower may also include engaging a stop mechanism configured to control movement of the needle assembly relative to the wash tower, as described herein. In certain embodiments, the step of introducing the needle assembly to the wash tower includes extending the puncture needle into the passageway a set distance beyond a pierce stroke length of the puncture needle.

Additionally, the step of inserting the sample needle into the puncture needle is delayed, where the delay can be either time based or volume based (e.g., 1 second of delay, 0.2 mL of wash delivered of delay, a 20% of total set wash delivery volume of delay, etc.). In some embodiments, the insertion of the sample needle is delayed until about 0.1 to about 5.0 seconds after the wash solution has been introduced to the wash tower. In other embodiments, the insertion of the sample needle into the puncture needle is delayed until after about 0.1 to about 10 mL of the wash solution has been introduced to the wash tower.

In additional embodiments, the method includes the step of stopping a flow of the wash solution after a user set wash protocol has been completed. A completed wash cycle may be determined by user set parameters, such as a wash time (e.g., a set amount of time has elapsed) or a wash volume (e.g., a set volume of wash solution has run through the system). In some embodiments, the wash cycle run time is about 0.1 to about 90 seconds. In other embodiments, the wash volume would be about 1 mL to about 15 mL. The method may also include the step of removing the vacuum from the internal space after about 0.1 to about 30 seconds have elapsed since the flow of the wash solution has stopped.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure and are not intended as a definition of the limits of the disclosure. For purposes of clarity, not every component may be labeled in every drawing. In the following description, various embodiments of the present disclosure are described with reference to the following drawings, in which.

DETAILED DESCRIPTION

Figure 1:
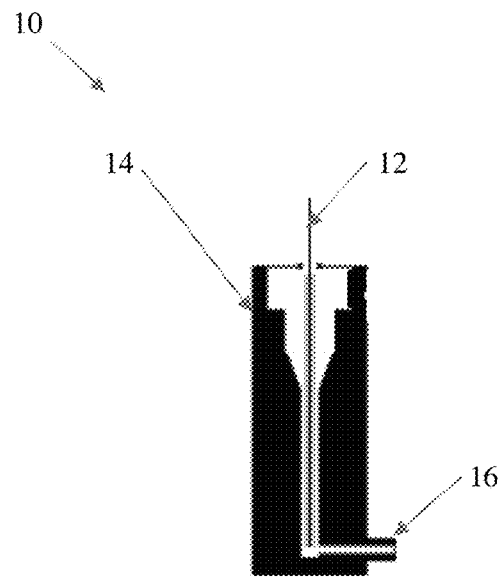
FIG. 1 is a schematic view of a prior art needle wash system.

Reference will now be made to the exemplary embodiments illustrated in the drawings, and specific language will be used here to describe the same. It will nevertheless be understood that no limitation of the scope of the disclosure is thereby intended. Alterations and further modifications of the inventive features illustrated herein, and additional applications of the principles of the disclosure as illustrated herein, which would occur to one skilled in the relevant art and having possession of this disclosure, are to be considered within the scope of the disclosure.

Figure 2:
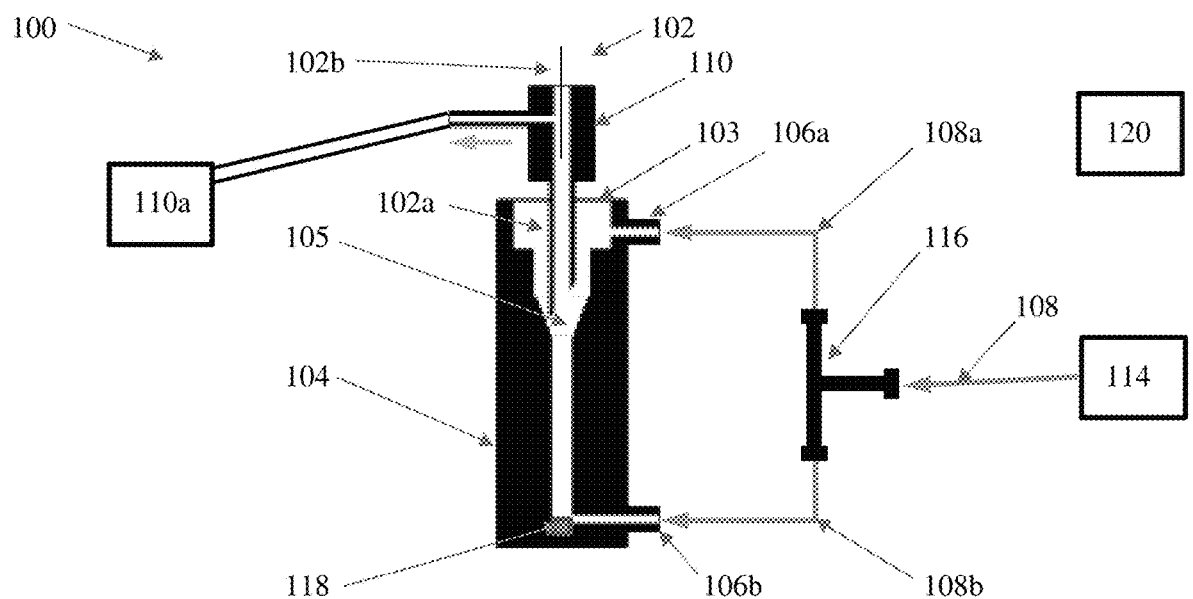
FIG. 2 is a schematic view of a dual needle wash system in accordance with one or more embodiments of the disclosure.

FIG. 2 depicts one embodiment of a system for washing a dual needle assembly 100. The system 100 may be part of a larger piece of laboratory equipment, but is essentially described herein with respect to the needle wash station. The system 100 includes a wash tower 104 configured to at least partially receive the dual needle assembly 102. The needle assembly 102 includes a first or puncture needle 102a and a second or sample needle 102b.

The wash tower 104 has an elongate body defining an opening 103 in a top surface thereof and a passageway or cavity 105 extending downwardly therefrom. In various embodiments, the passageway 105 extends along a substantial length of the wash tower 104. The wash tower 104 also includes two or more ports 106 in fluid communication with the passageway 105 so as to introduce or evacuate a cleaning solution 108 from the passageway 105. In the embodiment shown, a first port 106a is disposed proximate the top surface of the wash tower and a second port 106b is disposed proximate a bottom surface of the wash tower 104. In some embodiments, the wash tower 104 further includes a seal assembly 118 disposed at a distal end of the passageway 105 and configured to engage a distal end of the sample needle 102b as described in greater detail below.

The system 100 also includes an aspiration system 110 configured to engage at least a portion of the needle assembly 102 so as to evacuate any wash solution 108 or solution vapors resident in the needle assembly or the wash tower 104. In some embodiments, the aspiration system 110 is in fluid communication with a vacuum pump 110a and the ID of the puncture needle 102a. The system 100 further includes a pumping system 114 configured to deliver the wash solution 108 to at least one of the first port 106a or the second port 106b. The pumping system 114 is in fluid communication with the wash tower 104 via one or more lines of tubing, valves, ports, and fittings as necessary, including a tee or three-way valve 116 configured to split the flow for delivery to the first port 106a and the second port 106b on the wash tower 104. In some embodiments, the pumping system 114 is configured to deliver the wash solution 108 to the first port 106a and the second port 106b simultaneously. In various embodiments, the wash solution flow may be split 50-50 between the two parts; however, in some embodiments, the volume of wash solution 108 delivered to the ports 106a, 106b may be varied between the ports 106a, 106b to suit a particular application.

In some embodiments, the system 100 includes a controller 120 in electrical communication with at least the pumping system 114, the aspiration system 110, and a needle assembly drive system. The controller 120 is configured to control at least one of a movement of the needle assembly 102 relative to the wash tower 104, relative movement between the first needle 102a and the second needle 102b; actuation of the pumping system 114, actuation of the aspiration system 110, or a wash protocol as described herein.

FIGS. 3A-3D illustrate a dual needle wash system 200 during a needle wash process. Specifically, in FIG. 3A, the puncture needle 202a is introduced in to the wash tower 204 via an opening 203 in the top surface thereof. The aspiration system 210 is in fluid communication with the wash tower and is activated so that a vacuum is applied to the wash tower cavity 205 via an aspiration pump. In some embodiments, the aspiration system 210 relies on the puncture needle 202a having a connection, such as, for example, a barbed fitting connected to a length of tubing connected to a vacuum pump, along with any necessary fittings, valves, etc. The aspiration system 210 is activated before the delivery of any wash solution 208 to ensure that the wash solvent 208 will be sucked off without overflowing out the top of the wash tower 204. Prior to beginning step 2, ambient air 222 and possibly any loose debris may be exhausted from the system 200. In some embodiments, insertion length of the puncture needle 202a in the wash tower 204 exceeds the piercing/insertion length of the puncture needle 202a within the sample vials or well plates. For example, the needle assembly drive system can be configured to advance the puncture needle at two different strokes, for example, a 12 mm stroke for piercing the sample container seal and a 15 mm stroke for a wash process. The additional stroke length provides for a more complete washing of the puncture needle.

Figure 3A:
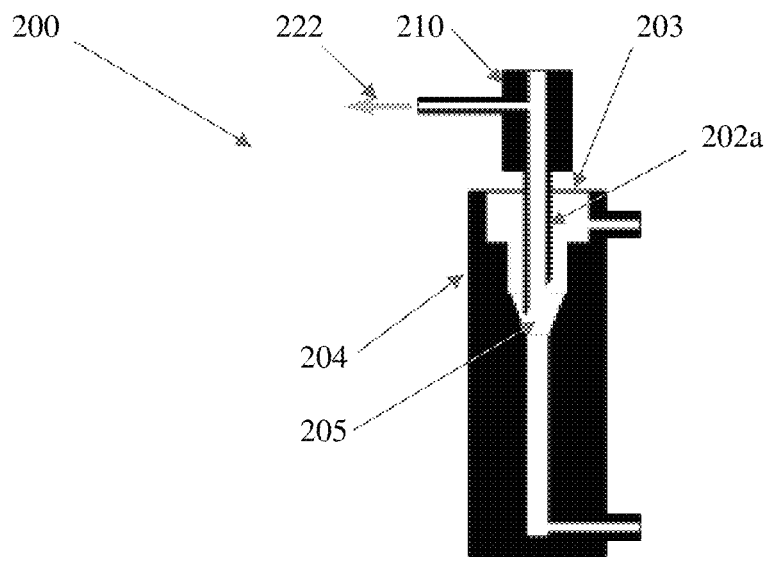
FIGS. 3A-3D are schematic views of a dual needle wash system during various stages of a wash process in accordance with one or more embodiments of the disclosure.
Figure 3B:
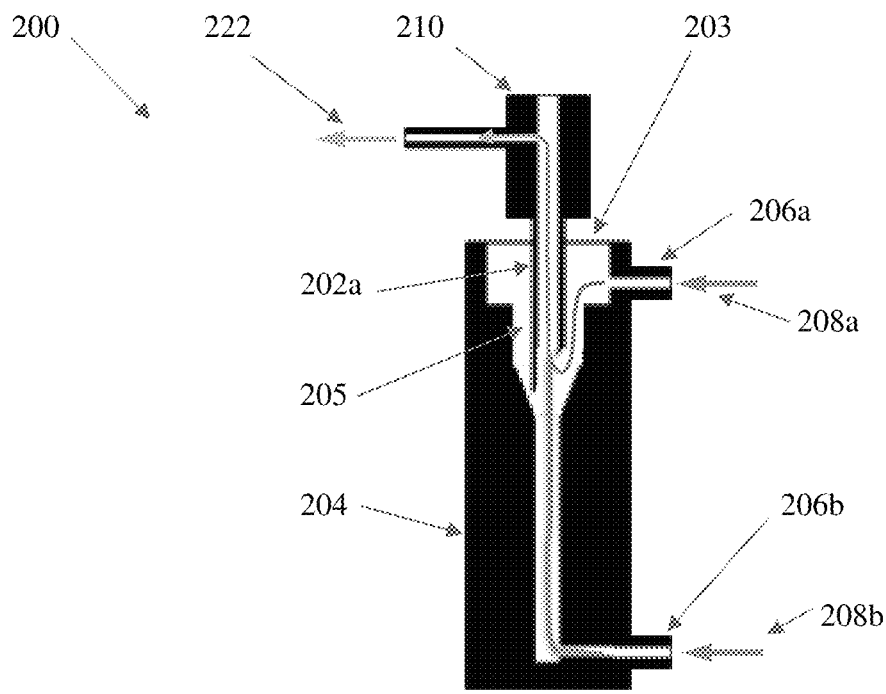

Step 2 is illustrated in FIG. 3B. At this step, the pumping system (114 in FIG. 2) is activated to deliver wash solution 208 to the system 200 via ports 206a, 206b in the wash tower 204. In various embodiments, the step of directing the wash solution 208 to the first port 206a and the second port 206b is carried out simultaneously, although in other embodiments, the wash solution can be introduced sequentially, for example, the solution can be introduced to the first port 206a and then introduced to the second port 206b after a set time or flow volume. Generally, the system 200 pauses for a set time to allow the wash solution (208a, 208b) to flow unimpeded through the system 200, specifically, through the ID of the puncture needle 202a. The wash solution flow 208a at the top inlet port 206a of the wash tower 204 hits the upper OD of the puncture needle 202a and washes the exterior surface of the puncture needle before being sucked down to the tip of the puncture needle and out the ID of the puncture needle 202a by the aspiration system 210.

Figure 3C:
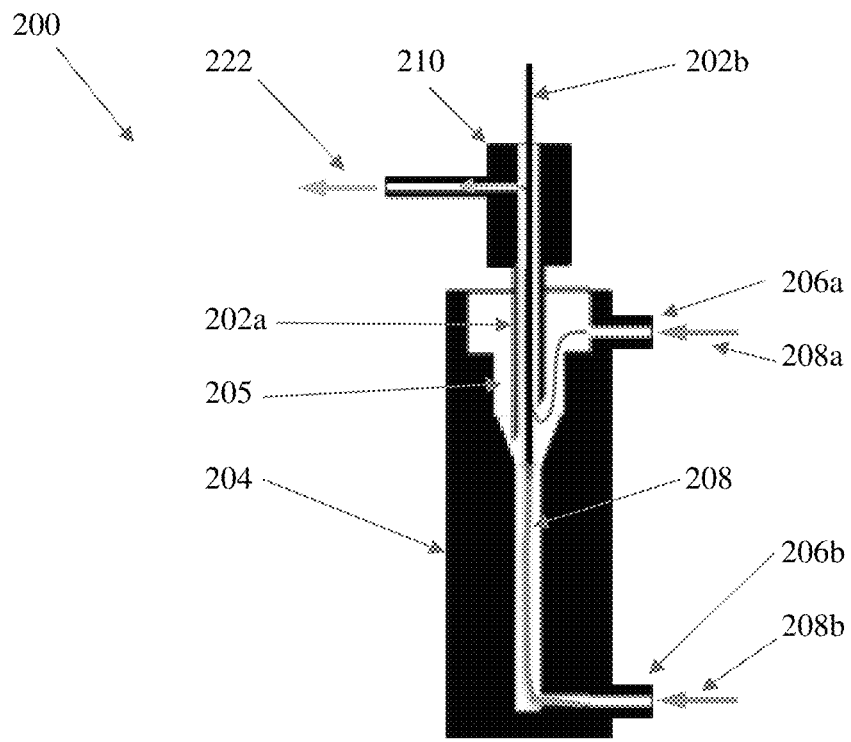
Figure 3D:
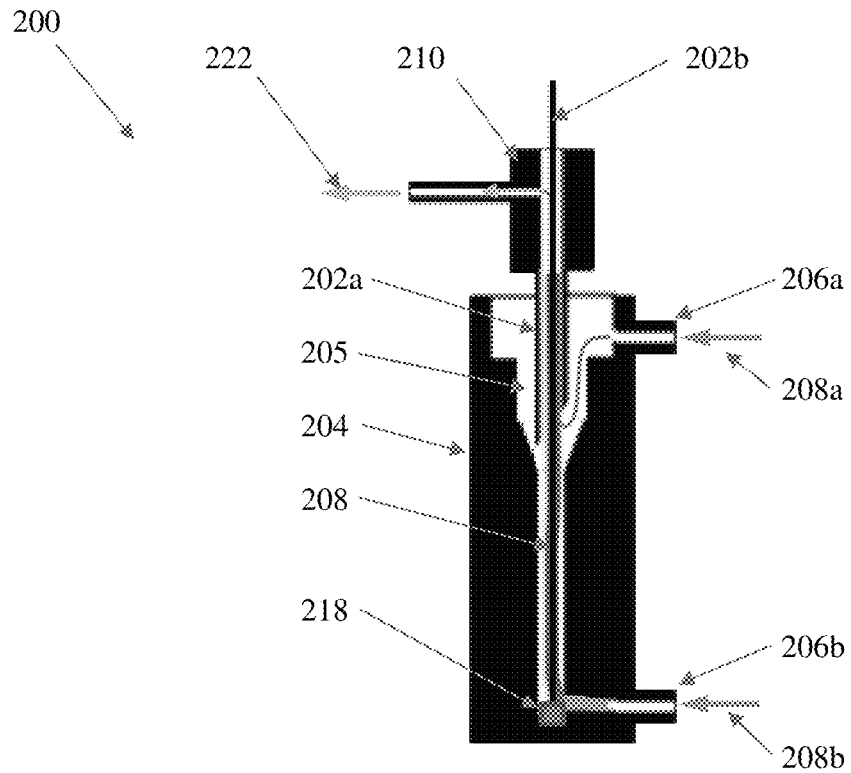

FIG. 3C illustrates step 3, where the sample needle 202b is introduced into the wash tower 204 via the ID of the puncture needle 202a. The introduction of the sample needle 202b to the ID of the puncture needle 202a generates additional resistance to the flow of the wash solution 208, thereby reducing the flow rate through the needle system. By delaying the insertion of the sample needle 202b in to the wash tower 204 until step 3 provides time for the ID of puncture needle 202a to be washed more effectively. In some embodiments, the step of inserting the sample needle 202b into the puncture needle 202a is delayed for about 0.1 to about 5.0 seconds after the wash solution 208 has been introduced to the wash tower 204 or until after about 0.1 to about 10 mL of the wash solution has been introduced to the wash tower. The specific delay will be determined by a wash protocol selected by a user to suit a particular application. As the sample needle 202b moves down the passageway 205 within the wash tower 204, the actively flowing wash solution 208, in addition to the relative motion of the sample needle 202b relative to the puncture needle 202a and the wash solution flow 208, provides for a more effective washing of the sample needle 202b.

Figure 4A:
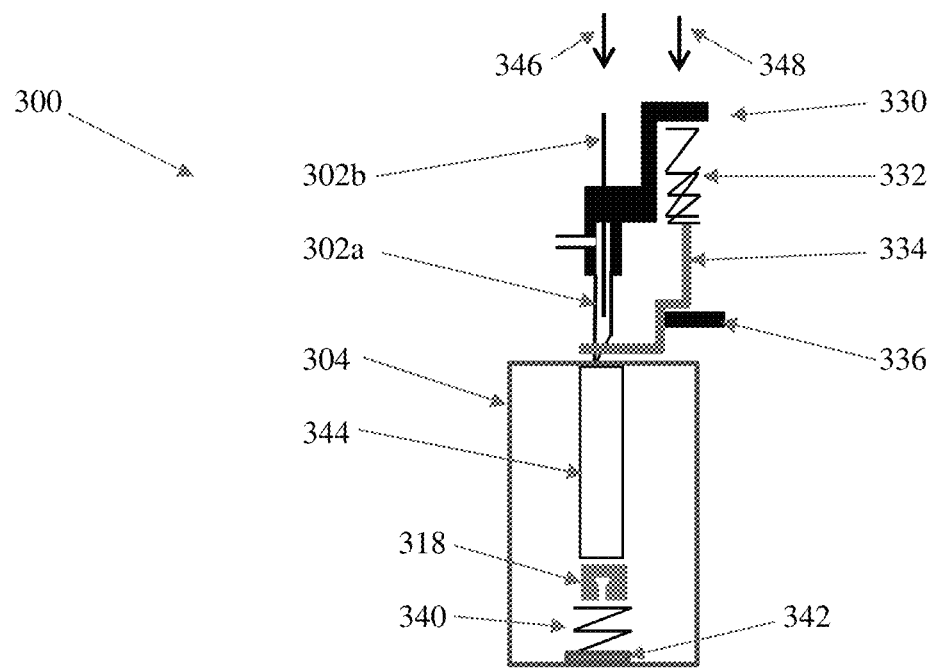
FIGS. 4A and 4B depict the interaction of the needle assembly and the wash tower in greater detail in accordance with one or more embodiments of the disclosure.
Figure 4B:
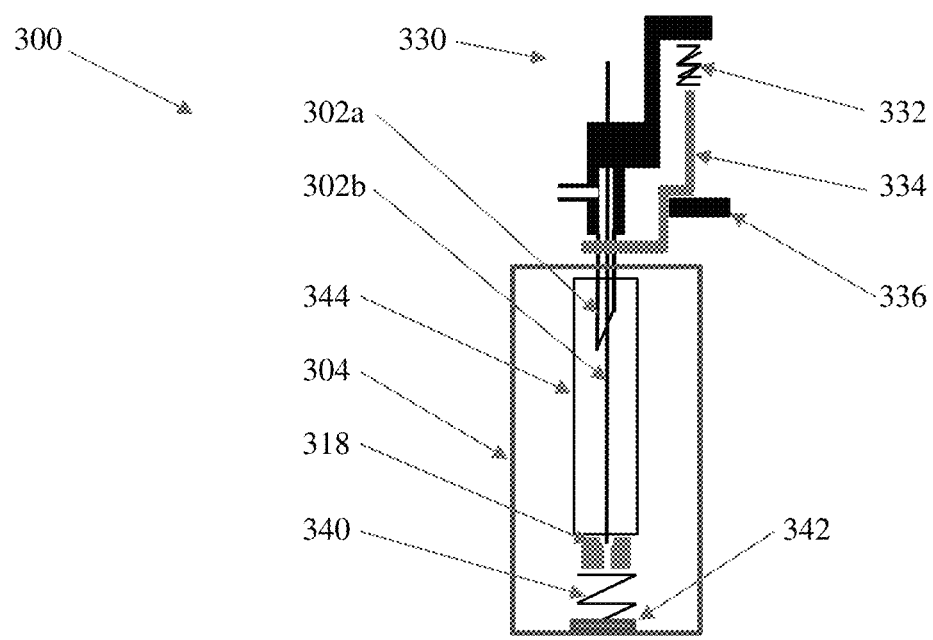

In step 4, as shown in FIG. 3B, the sample needle 202b is completely inserted within the wash tower 204 and the tip thereof engages a seal assembly 218 (see FIGS. 4A and 4B for additional details). Once the sample needle 202b is fully inserted in to the wash tower 204, the wash solution flow 208b introduced to the bottom inlet port 206b washes the OD of a lower portion of the sample needle 202b as the solution 208 is drawn up vertically through the wash tower 204 and out through the ID of the puncture needle 202a via the aspiration system 210. The used wash solution, debris, and solvent vapors (collectively 222) are drawn away from the needle assembly by the aspiration pump and directed to a proper waste receptacle or recycling process. Once the process is complete, the pumping system is deactivated allowing the aspiration system 210 to fully evacuate any solution or vapors from the wash tower 204 and needle assembly 202. The specific run times for the flow of wash solution 208 after full insertion of the needle system 202 and the run times for the aspiration system, both during and after the flow of wash solution, will vary to suit a particular application and can be set via a wash protocol selected by a user (e.g., for 10 seconds to 10 minutes or for 10 mL to 1 liter of wash solution).

The dual delivery of the wash solution 208 at both the top and bottom of the wash tower 204 improves the washing process by ensuring an effective washing of the OD of the puncture needle 202a at the top of the wash tower 204 and the OD of the sample needle 202b at the bottom of the wash tower 204.

Figure 4C:
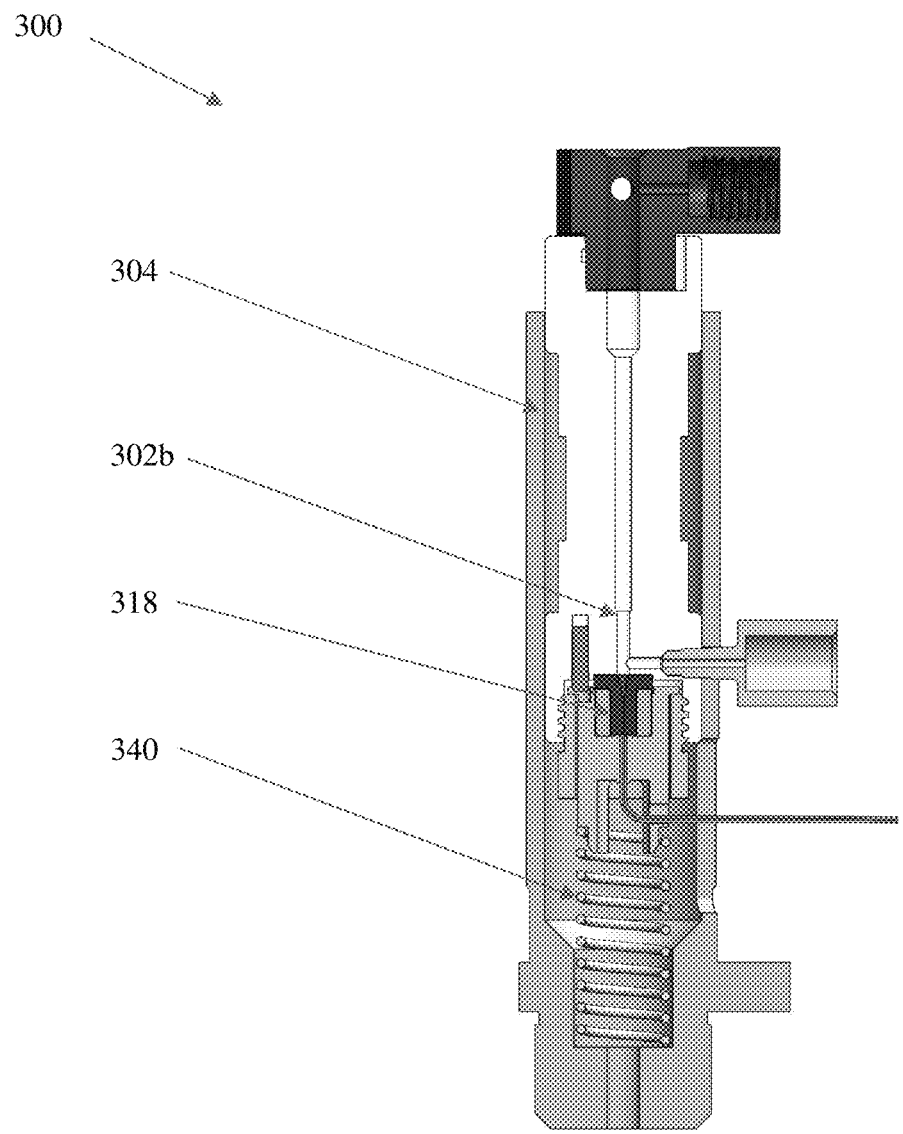
FIG. 4C is an enlarged pictorial representation of the sample needle engaging the wash tower in even greater detail in accordance with one or more embodiments of the disclosure.

FIGS. 4A, 4B, and 4C illustrate the movement of the needle assembly 302 relative to the wash tower 304 before the wash cycle starts and during the wash cycle, in particular step 4. As shown in FIG. 4A, the system 300 includes a needle assembly 302a, 302b (collectively 302) and a drive system 330 that incorporates a collection of drivers (e.g., electric motors) and mechanisms necessary to move the needle assembly 302 between a sample station and the wash station and relative to the wash tower 304 (e.g., X, Y, and Z directions). A portion of the drive system 330 includes a stripper foot 334 for directing the needle assembly in to the wash tower 304 and a stripper foot spring 334. During operation of the wash cycle, the stripper foot 334 will interact with a stop mechanism disposed within the system 300. The stop mechanism 336 is configured to control movement of the needle assembly 302 relative to the wash tower 304 (e.g., to prevent contact between the needle assembly, or at least a portion thereof, with the wash tower). Disposed at the distal end of the wash tower 304, and at least partially within the passageway, is the needle seal assembly 318 and related components, such as a needle seal spring 340, and a force sensor 342, along with various supporting components. The needle seal assembly 318 is configured to engage with the distal end of the sample needle 302*b*. The force sensor 342 is configured to provide feedback on the engagement of the sample needle 302*b* with the seal assembly 318 and may be a load cell or similar device. In some embodiments, the system 300 includes a needle support sleeve 344 slidably disposed within the wash tower 304 and configured to keep the sample needle 302*b* from buckling and guide the sample needle 302*b* into the seal 318.

FIGS. 4B and 4C correspond generally to step 4 insofar as they depict the sample needle 302*b* being fully inserted in to the wash tower 304. As shown in FIG. 4B, the puncture needle 302*a* has been inserted in to the wash tower 304 and is being cleaned as part of the wash cycle, as wash solution is flowing through the system during this process. The puncture needle 302*a* is driven in to the wash tower via the stripper foot 334 and a Zp-axis (348) motor that is part of the drive system 330. Travel of the puncture needle 302*a* ends once the stripper foot 334 contacts the stop 336. The stripper foot spring 332 assists in returning the puncture needle to its neutral position.

The drive system 330 also includes a parallel Z-axis (346) motor that drives the sample needle 302*b* vertically into the wash tower 304 and into contact with the needle seal assembly 318 (See FIG. 4C). As movement of the sample needle 302*b* continues, the needle seal spring 340 is compressed and the sealing force on the distal tip of the sample needle increases. The force sensor 342 provides feedback to the system 300 ensuring that the needle 302*b* is loaded and sealed correctly within the wash tower 304. The feedback also assures that needle 302*b* is not damaged during the wash cycle. In some embodiments, the force sensor 342 is removed and the needle seal spring 340 is provided with an appropriate preload to ensure proper sealing. In certain embodiments, the sample needle is inserted in to an injection station, such that the sample needle tip pushes against the needle seal to seal the needle to system pressure of the wash fluid within the wash tower.

The Z-axis motor drives the sample needle in to the needle seal, while the Zp-axis motor arrangement keeps the stripper foot clear of the wash tower. If the stripper foot 334 is driven down on to the top of the wash tower 304, an additional force is introduced to the wash tower and proper sealing of the sample needle will not occur. The stop 336 also prevents over-compression of the needle seal spring 340.

In general, the word "controller" or "processor" are used herein in their broad and ordinary sense and refer, for example, to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts.

Software instructions may be embedded in firmware, such as an EPROM. It will be further appreciated that hardware modules may be comprised of connected logic units, such as gates and flip-flops, and/or may be comprised of programmable units, such as programmable gate arrays, application specific circuits, or hardware processors. The modules described herein are preferably implemented as software modules, but may be represented in hardware or firmware.

Generally, the controllers/processors described herein refer to logical modules that may be combined with other modules or divided into sub-modules despite their physical organization or storage.

The various logical blocks, modules, data structures, and processes referred to herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, a microcontroller, a state machine, combinations of the same, or the like. A processor may also be implemented as a combination of computing devices, for example, a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware or firmware, in a software module executed by a hardware processor, or in a combination of the two. For example, each of the processes described above may also be embodied in, and fully automated by, software modules executed by one or more machines such as computers or computer processors. A module may reside in a non-transitory computer-readable storage medium such as RAM memory, flash memory, ROM memory, EPROM memory, EEPROM memory, registers, a hard disk, a removable disk, an optical storage disk, memory capable of storing firmware, or any other form of computer readable storage medium. An exemplary computer-readable storage medium can be coupled to a processor such that the processor can read information from, and write information to, the computer readable storage medium. In the alternative, the computer-readable storage medium may be integral to the processor. The processor and the computer-readable storage medium may reside in an ASIC. Hardware components may communicate with other components via wired or wireless communication networks such as, e.g., the Internet, a wide area network, a local area network, or some other type of network.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives.

Furthermore, those skilled in the art should appreciate that the parameters and configurations described herein are exemplary and that actual parameters and/or configurations will depend on the specific application in which the systems and techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto; the disclosure may be practiced other than as specifically described.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:

1. A system for washing a needle assembly having a first needle and a second needle, the system comprising:
   the needle assembly, wherein the first needle is a puncture needle having an outer diameter and an inner diameter and the second needle is a sample needle disposable within the inner diameter of the puncture needle;
   a wash tower comprising an elongate body defining an opening in a top surface thereof and a passageway extending downwardly therefrom, wherein the opening is configured to at least partially receive the needle assembly;
   a first port disposed proximate the top surface of the wash tower and in fluid communication with the passageway;
   a second port disposed proximate a bottom surface of the wash tower and in fluid communication with the passageway;
   a pumping system configured to deliver a wash solution to at least one of the first port or the second port;
   an aspiration system in fluid communication with the inner diameter of the puncture needle so as to evacuate any wash solution or solution vapors resident in the needle assembly or the wash tower;
   a needle assembly drive system comprising a first drive mechanism configured to move the first needle relative to the wash tower and a second drive mechanism configured to move the second needle relative to the first needle and the wash tower; and
   a controller in electrical communication with the pumping system, the aspiration system, and the needle assembly drive system, wherein the controller is configured to:
      introduce the first needle to the wash tower via the needle assembly drive system;
      activate the aspiration system;
      activate the pumping system to deliver the wash solution to the wash tower;
      subsequently, introduce the second needle to the wash tower via the needle assembly drive system and through the first needle;
      deactivate the pumping system; and
      deactivate the aspiration system.

2. The system of claim 1, wherein the pumping system is configured to deliver the wash solution to the first port and the second port simultaneously.

3. The system of claim 1, further comprising a seal assembly disposed at an end of the passageway opposite the opening in the top surface of the wash tower and configured to engage a distal end of the sample needle.

4. The system of claim 3, further comprising a force sensor disposed at the end of the passageway opposite the opening in the top surface of the wash tower and configured to provide feedback on the engagement of the sample needle with the seal assembly.

5. The system of claim 1, wherein the needle assembly drive system comprises a stop mechanism configured to limit travel of the first needle relative to the wash tower.

6. The system of claim 1, wherein the controller is further configured to control a user set wash protocol.

7. The system of claim 1, wherein the passageway extends along a substantial length of the wash tower.

* * * * *